C. S. GOWLLAND.
SIGHT TESTING APPARATUS.
APPLICATION FILED NOV. 13, 1911.
1,119,273.  Patented Dec. 1, 1914.
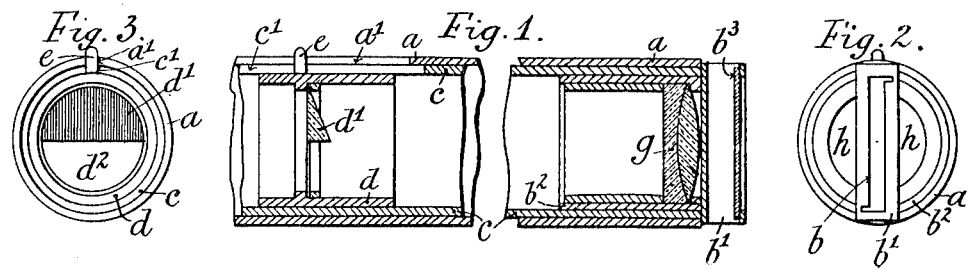
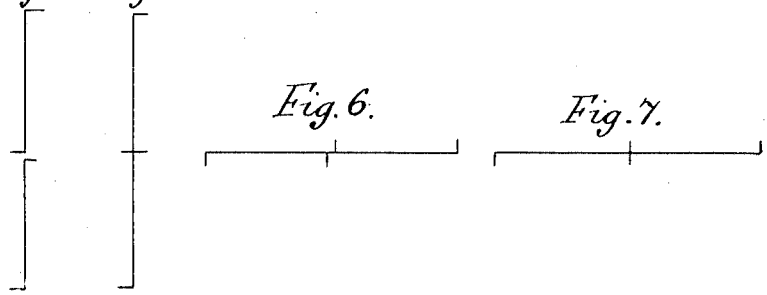
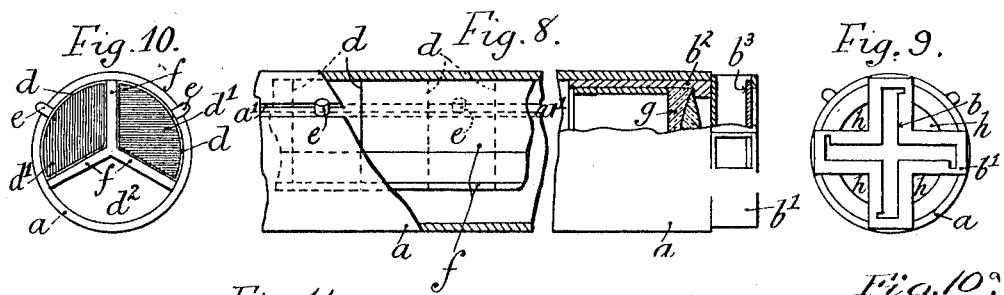
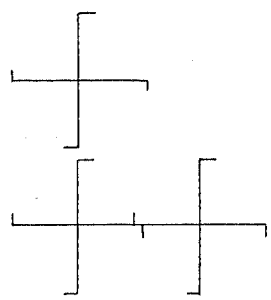
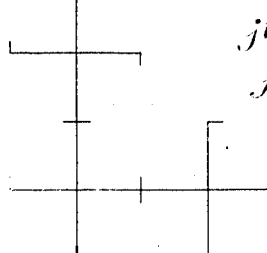
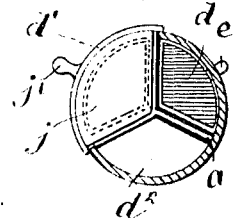
Witnesses:
H.T.Fee
Vollas W.Ward.
Inventor:
Chas. S. Gowlland.
By Spear Middleton Donaldson Spear
Attorneys.

UNITED STATES PATENT OFFICE.

CHARLES S. GOWLLAND, OF CROYDON, ENGLAND.

SIGHT-TESTING APPARATUS.

1,119,273.   Specification of Letters Patent.   Patented Dec. 1, 1914.

Application filed November 13, 1911. Serial No. 660,076.

*To all whom it may concern:*

Be it known that I, CHARLES SEPTIMUS GOWLLAND, subject of George V, King of Great Britain and Ireland, and residing at Morland Road, Croydon, in the county of Surrey, England, have invented certain new and useful Improvements in Sight-Testing Apparatus, of which the following is a specification.

In testing for astigmatism of the eye, the correct portion of the cornea to test is its central area. With ophthalmometers or keratometers, as heretofore constructed, this cannot be done, owing to the mire or mires being arranged around the telescope tube thereof, and consequently being reflected laterally with respect to said central area.

Now, the chief object of my present invention is to enable corneal astigmatism to be measured in the said central area, and to this end I arrange the mire so that its image lies across the center of the cornea. I am thus enabled to avoid what are known as "extra" images, which are confusing to the observer.

In carrying out this invention, I prefer to arrange the mire across the axis of the telescope tube at the patient's end, and to employ one consisting either of a single elongated and rectangular slot with oppositely directed end spurs, or two such slots arranged in the form of a cross. The spaces between the mire and the telescope tube operate in the same way as the apertures in the Scheiner diaphragm used in ophthalmometers or keratometers, so that said mire can be used also as the Scheiner diaphragm in carrying out this invention.

In order that this invention may be clearly understood and readily carried into effect, I will proceed to describe the same with reference to the accompanying drawings, wherein—

Figure 1 is a central vertical section of so much of an ophthalmometer or keratometer as is material for the purpose of this specification and shows the arrangement when a single refracting prism is used, and Figs. 2 and 3 are elevations of the right-hand end and left hand end respectively of Fig. 1. Figs. 4 and 5 represent diagrammatically the images of the mire shown in Figs. 1 and 2, as such images appear on one meridian of an ordinary astigmatic cornea when their end-spurs are out of alinement and in alinement respectively, and Figs. 6 and 7 are similar views to Figs. 4 and 5 excepting that the meridian here represented is at right angles to that shown in the latter figures. Figs. 8, 9 and 10 are similar views to Figs. 1, 2 and 3 respectively, excepting that they show the arrangement when two prisms are used, and Fig. 10$^a$ is a section through the telescope tube and shows a movable diaphragm for covering one of the prisms of the prism system for the purpose hereinafter referred to. Figs. 11 and 12 represent diagrammatically the images of the mire shown in Figs. 8 and 9 as they appear on two meridians of the cornea at right angles to one another, when the end-spurs are out of alinement and in alinement respectively.

Like letters refer to like parts throughout the drawings.

Describing first Figs. 1, 2 and 3 of the drawings, $a$ represents the usual telescope-tube of an ophthalmometer or keratometer, and $b$ the mire, which is conveniently formed in a box $b'$ mounted on the external end of a liner $b^2$. This liner fits friction-tight in the outer end of a tube $c$, the inner end of which contains the prism-carrier $d$. A single refracting prism $d'$ is used, leaving an open space $d^2$. $e$ is a pin projecting from the prism-carrier $d$ through a slot $c'$ formed in the tube $c$, and also through a slot $a'$ formed in the telescope-tube $a$. For the purpose of taking a reading, the position of the prism may be adjusted by means of a cam in the same way as that referred to for such purpose in the specification of Great Britain Letters Patent No. 24010 of 1910. $g$ is the usual objective. The mire $b$ consists of a single opening of elongated rectangular form provided with laterally extending spurs at its ends, as illustrated, and is arranged in front of the box $b'$ which is of a shape approximately to that of the mire. The opening in the box may be covered by a piece of opal $b^3$ which may be illuminated by an incandescent lamp placed within the box, or from a source of light placed elsewhere, or instead of opal I may use a piece of silvered glass illuminated by light coming from behind the patient. At the sides of the box $b'$ spaces $h$, $h$ are left through which light passes from the patient's eye to the observer's eye; thus the box $b'$ acts as a Scheiner diaphragm, producing splitting of the image when the instrument is out of focus, thereby enabling the instrument to be accurately focused.

In using the instrument, focus is first obtained in the usual way, and then the patient's cornea, which I will assume is an ordinary astigmatic one, is brought into observation. There will now be seen two images on the patient's cornea placed, it may be, as shown in Fig. 4 or Fig. 6, depending upon which axis is being tested, one of these images being stationary and observed through the opening $d^2$, and the other movable and observed through the prism $d'$. The position of the prism is then adjusted as already described, until the spur at the inner end of the movable image is brought into alinement with the spur at the adjacent end of the fixed image, as shown in Fig. 5 or Fig. 7, whereupon the reading is taken as usual. The reading of one axis having been taken, the prism and mire are then rotated through 90° by turning the tube $c$ through the same angle, and then the other axis is read.

Referring now to Figs. 8, 9 and 10 of the drawings, the liner $b^2$ carrying the mire box $b'$ fits friction-tight direct in the outer end of the telescope-tube $a$, in the inner end of which a member is fixed comprising three wings $f, f$ radiating from a common center. In each of the upper sector-shaped spaces or pockets formed between the wings and the subtending portion of the telescope-tube $a$ the prism-carriers $d, d$, carrying the prisms $d', d'$, respectively, are slidingly fitted, the prisms being arranged with their bases at right angles to one another. The lower sector-shaped space or sprocket $d^2$ is left open. Each prism-carrier is provided with a pin $e$ projecting through a slot $a'$ in the telescope-tube, and its position may be adjusted for the purpose of enabling a reading to be taken by means of a cam as already described in connection with the instrument indicated in Figs. 1, 2 and 3, it being understood that in addition to the registering-wheel $h$, shown in the drawings accompanying the said specification of Great Britain Letters Patent No. 24010 of 1910, being provided with a cam-surface for adjusting one of the prisms $d'$ (Figs. 8 and 9 of the present specification), the registering-wheel drawn parallel therewith would be provided with a similar cam-surface for adjusting the other of said prisms. The mire $b$ consists of two openings of the shape shown in Fig. 2, arranged in the form of a cross as shown most clearly in Fig. 9.

In use, the instrument indicated in Figs. 8, 9 and 10 is focused and the patient's cornea (assumed to be an ordinary astigmatic one) brought under observation as already described above in connection with Figs. 1, 2 and 3. There will now be seen three images on the patient's cornea placed, it may be, as shown in Fig. 11, one, the middle image, which is stationary and observed through the opening $d^2$, and the two remaining images, which are movable and observed through the respective prisms $d'$, $d'$. The movable prisms are disposed on axes arranged at right-angles to one another. The position of the prisms is then adjusted so as to bring the spurs at the inner end of the movable images into alinement with the spurs at the adjacent ends of the fixed image, as shown in Fig. 12, and when this has been done the reading is taken.

In cases of mixed astigmatism it is difficult, with a single-position instrument, to find the variation from 90° of one axis with respect to the other. According to this invention however, this is enabled to be done with the single position instrument, indicated in Figs. 8, 9 and 10 by eliminating the optical effect of one of the prisms, and this I preferably do by covering one of the prisms with a shutter, thereby converting the instrument into a double position one. This shutter is shown at $j$ (Fig. 10$^a$) and it is placed in a slot near the observer's end of the telescope tube and provided with a handle $j'$ so that it can be readily inserted into and withdrawn from said slot. The duplication or multiplication of the images may, in carrying out this invention, be effected by any other construction or by any other method than that described.

It will be readily understood that the reduction of the number of images and the increased accuracy obtained in observing the image through the opening $d^2$ are important advantages, accruing from the adoption of this invention. Also, by this invention, less illumination is required for the mire; the instrument is reduced in size and there is greater convenience to the patient.

I claim:

1. In an ophthalmometer or keratometer, the combination with the telescopic tube and prism, of a mire arranged across the axis of the tube.

2. In an ophthalmometer or keratometer, the combination with the telescopic tube and prism, of a mire arranged across the axis of the tube and at the patient's end and comprising a straight slot with oppositely directed end spurs.

3. In an ophthalmometer or keratometer, a prism system having an opening through which a stationary image is observed.

4. In a single position ophthalmometer or keratometer having a plurality of prisms and a clear opening, a shutter for covering all but one of said prisms for the purpose of converting the instrument into a double-position instrument, substantially as described.

5. In an ophthalmometer or keratometer, the combination with the telescope-tube of a prism carrier, means for longitudinally sliding the prism carrier in the telescope tube, a prism in said prism-carrier and a clear space between the prism and the subtending portion of the prism-carrier.

6. In an ophthalmometer or keratometer, the combination with the telescope tube of a three-winged member fixed therein, prisms slidingly fitted within two of the pockets formed between the wings and the corresponding subtending portion of the telescope tube, means for moving the prisms, and a clear opening through the space between the wings not occupied by a prism.

7. For use in an ophthalmometer or keratometer a mire comprising a member having an elongated rectangular opening and oppositely directed end-spurs at the ends of said opening.

8. For use in an ophthalmometer or keratometer, a mire comprising two members arranged in the form of a cross and each comprising a member having an elongated rectangular opening and oppositely directed end-spurs at the ends of said opening.

In witness whereof I have hereunto set my hand in the presence of two witnesses.

CHAS. S. GOWLLAND.

Witnesses:
GEORGE CHILD,
CHARLES LUCKER.

Copies of this patent may be obtained for five cents each, by addressing the "Commissioner of Patents. Washington, D. C."